United States Patent
Genier

(10) Patent No.: US 8,897,611 B2
(45) Date of Patent: Nov. 25, 2014

(54) OPTICAL FIBER INTERFACES COMPRISING LIGHT BLOCKING ELEMENTS AND ILLUMINATION SYSTEMS COMPRISING LIGHT BLOCKING ELEMENTS

(75) Inventor: Michael Lucien Genier, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 198 days.

(21) Appl. No.: 13/605,153

(22) Filed: Sep. 6, 2012

(65) Prior Publication Data
US 2014/0064661 A1 Mar. 6, 2014

(51) Int. Cl.
*G02B 6/32* (2006.01)

(52) U.S. Cl.
USPC .................................................. 385/33

(58) Field of Classification Search
None
See application file for complete search history.

(56) References Cited

U.S. PATENT DOCUMENTS

| | | | |
|---|---|---|---|
| 4,322,126 A | 3/1982 | Minowa et al. | |
| 5,337,388 A | 8/1994 | Jacobowitz et al. | |
| 6,018,389 A | 1/2000 | Kyle et al. | |
| 6,264,373 B1 | 7/2001 | Fujimori et al. | |
| 6,340,246 B1 | 1/2002 | Yoshida et al. | |
| 6,461,054 B1 * | 10/2002 | Iwase ............................ | 385/73 |
| 6,549,704 B2 | 4/2003 | Ukrainczyk | |
| 6,845,210 B2 | 1/2005 | Ohbayashi et al. | |
| 6,866,424 B2 | 3/2005 | Tanaka et al. | |
| 6,904,197 B2 | 6/2005 | Bhagavatula et al. | |
| 6,963,682 B2 | 11/2005 | Bhagavatula et al. | |
| 6,984,075 B2 | 1/2006 | Satoh | |
| 7,062,135 B2 | 6/2006 | Caracci et al. | |
| 7,118,285 B2 | 10/2006 | Fenwick et al. | |
| 7,192,194 B2 | 3/2007 | Giotto et al. | |
| 7,228,033 B2 | 6/2007 | Bhagavatula et al. | |
| 7,241,057 B2 * | 7/2007 | Koreeda et al. ............... | 385/75 |
| 7,400,794 B1 | 7/2008 | Pang et al. | |
| 2006/0210224 A1 * | 9/2006 | Koreeda et al. ............... | 385/70 |
| 2007/0019913 A1 * | 1/2007 | Iwai et al. ..................... | 385/56 |
| 2007/0098330 A1 * | 5/2007 | Ozawa et al. ................. | 385/76 |
| 2007/0292081 A1 | 12/2007 | Hashimoto et al. | |
| 2011/0305035 A1 | 12/2011 | Bickham et al. | |
| 2012/0033918 A1 * | 2/2012 | Jibiki et al. ................... | 385/75 |
| 2012/0195555 A1 * | 8/2012 | Jibiki et al. ................... | 385/75 |

FOREIGN PATENT DOCUMENTS

WO WO02/103424 12/2002

* cited by examiner

*Primary Examiner* — Sung Pak
(74) *Attorney, Agent, or Firm* — Svetlana Short

(57) ABSTRACT

An optical fiber interface includes an optical fiber connector including a receptacle and an axis of propagation along which light traverses through the optical fiber connector. The receptacle includes a first member pivotably attached to the receptacle. The first member includes a first aperture. The first member has a blocking position relative to the receptacle in which the first aperture is not aligned with the axis of propagation, such that light traversing along the axis of propagation does not pass through the first aperture. The first member has a transmitting position relative to the receptacle in which the first aperture is aligned with the axis of propagation such that light traveling along the axis of propagation passes through the first aperture.

19 Claims, 8 Drawing Sheets

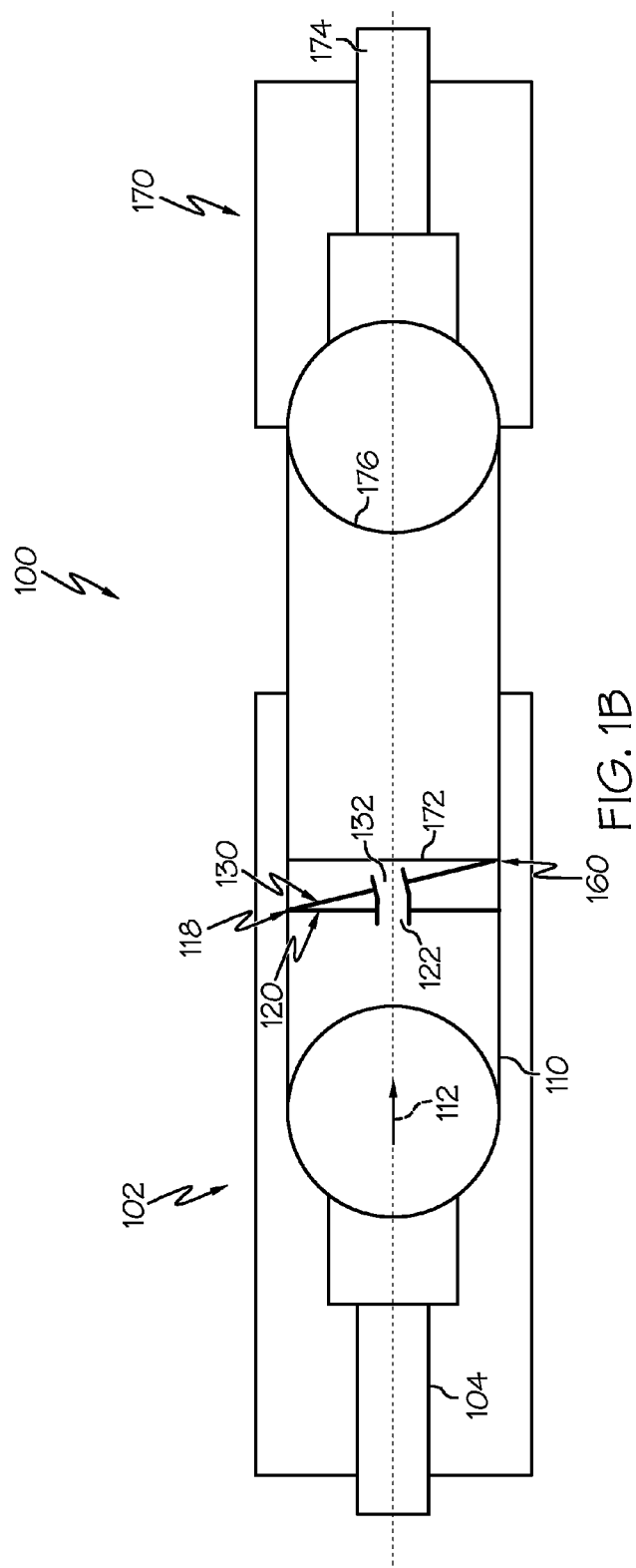

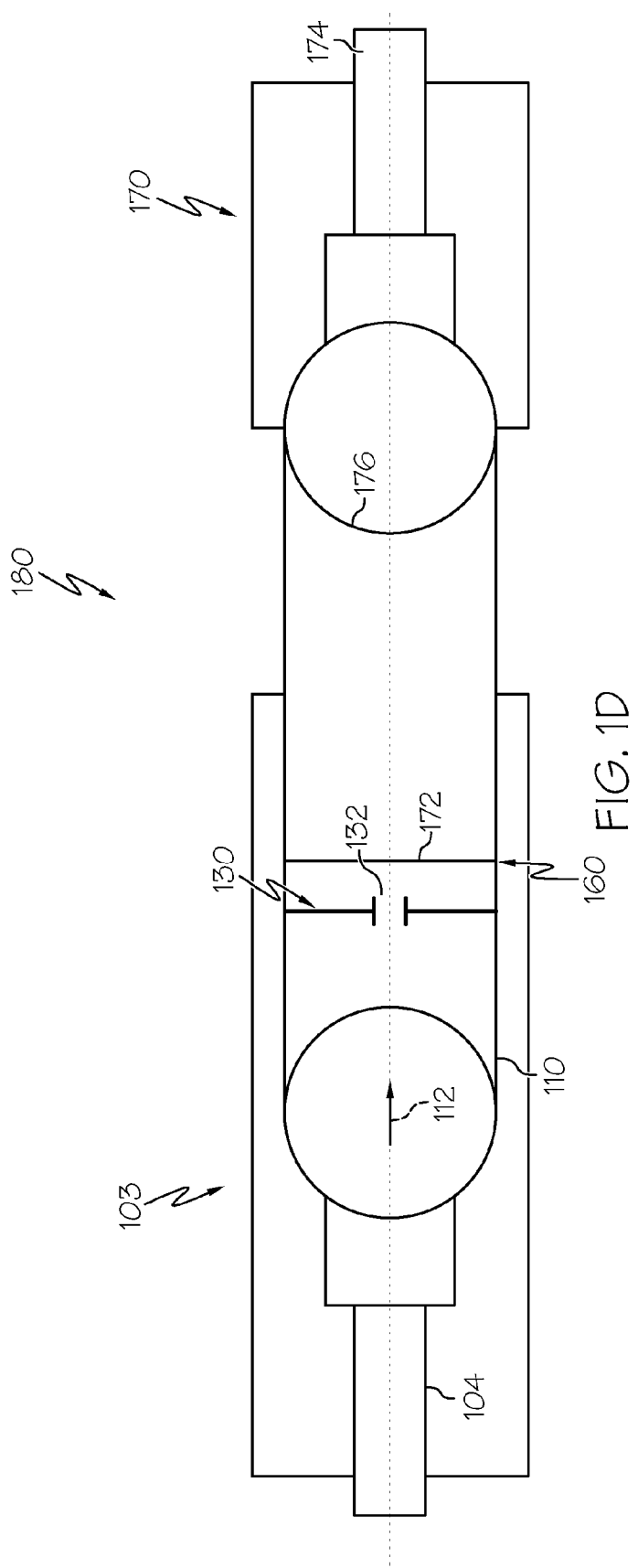

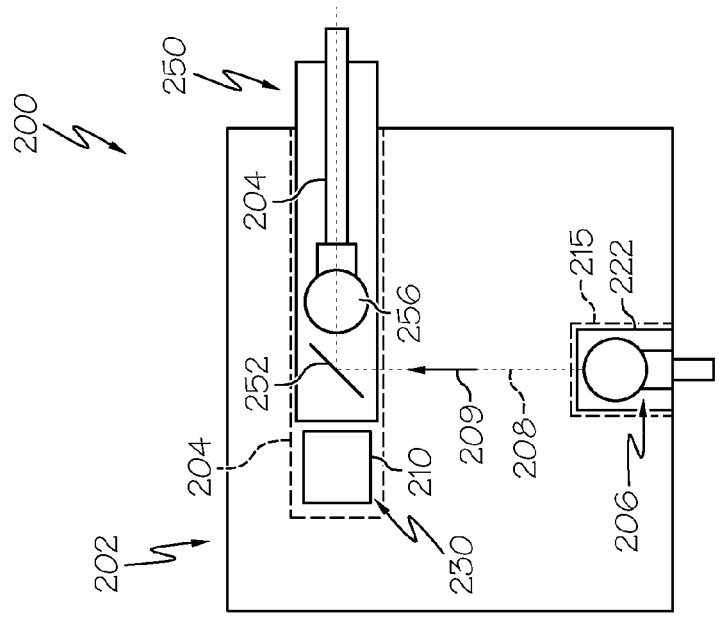
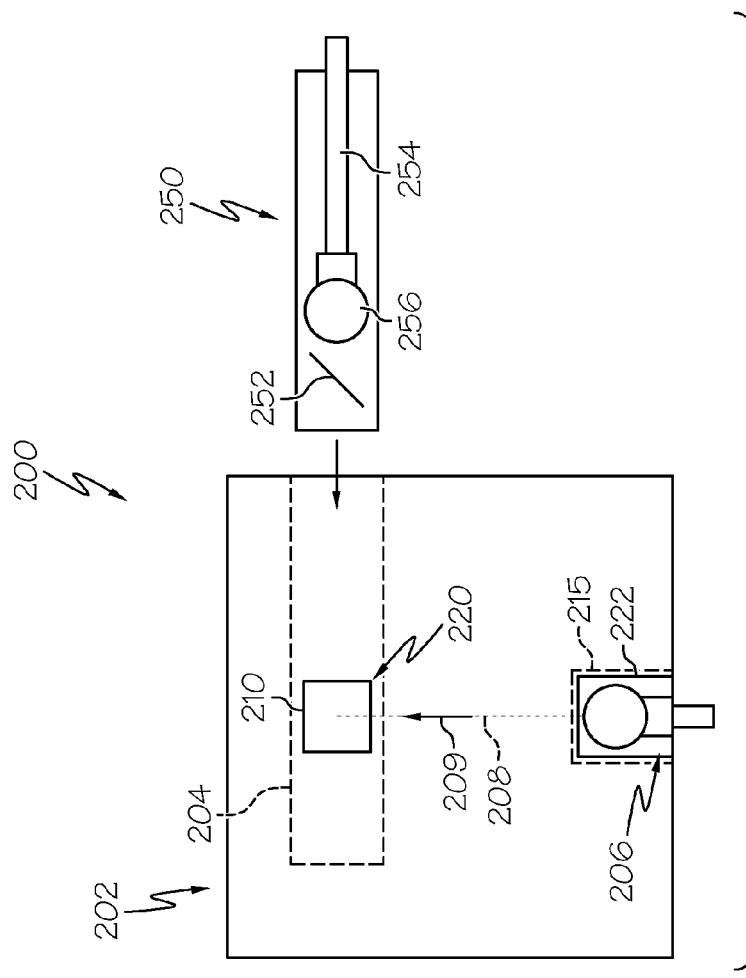
FIG. 2B
FIG. 2A

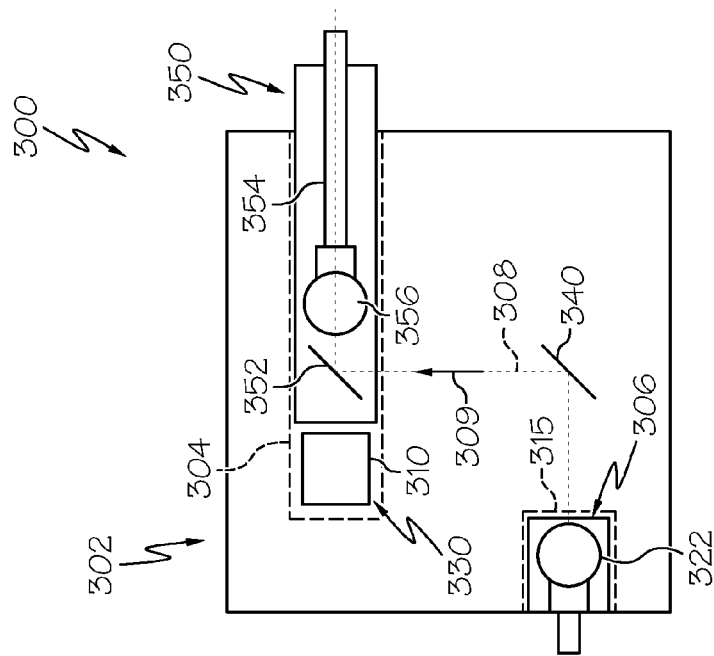
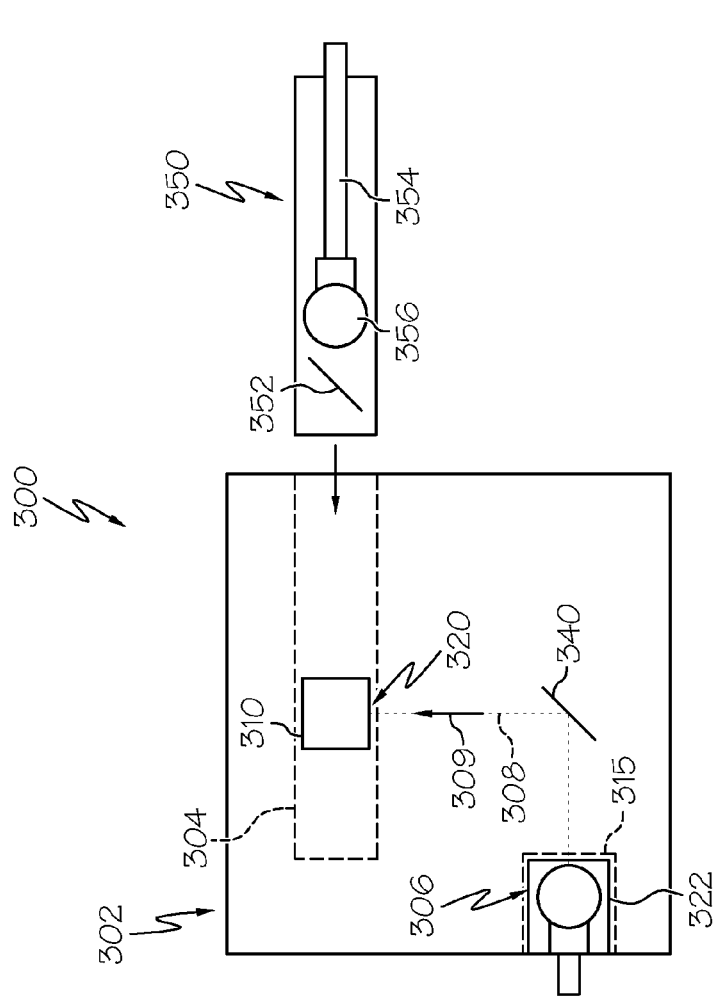
FIG. 3A
FIG. 3B

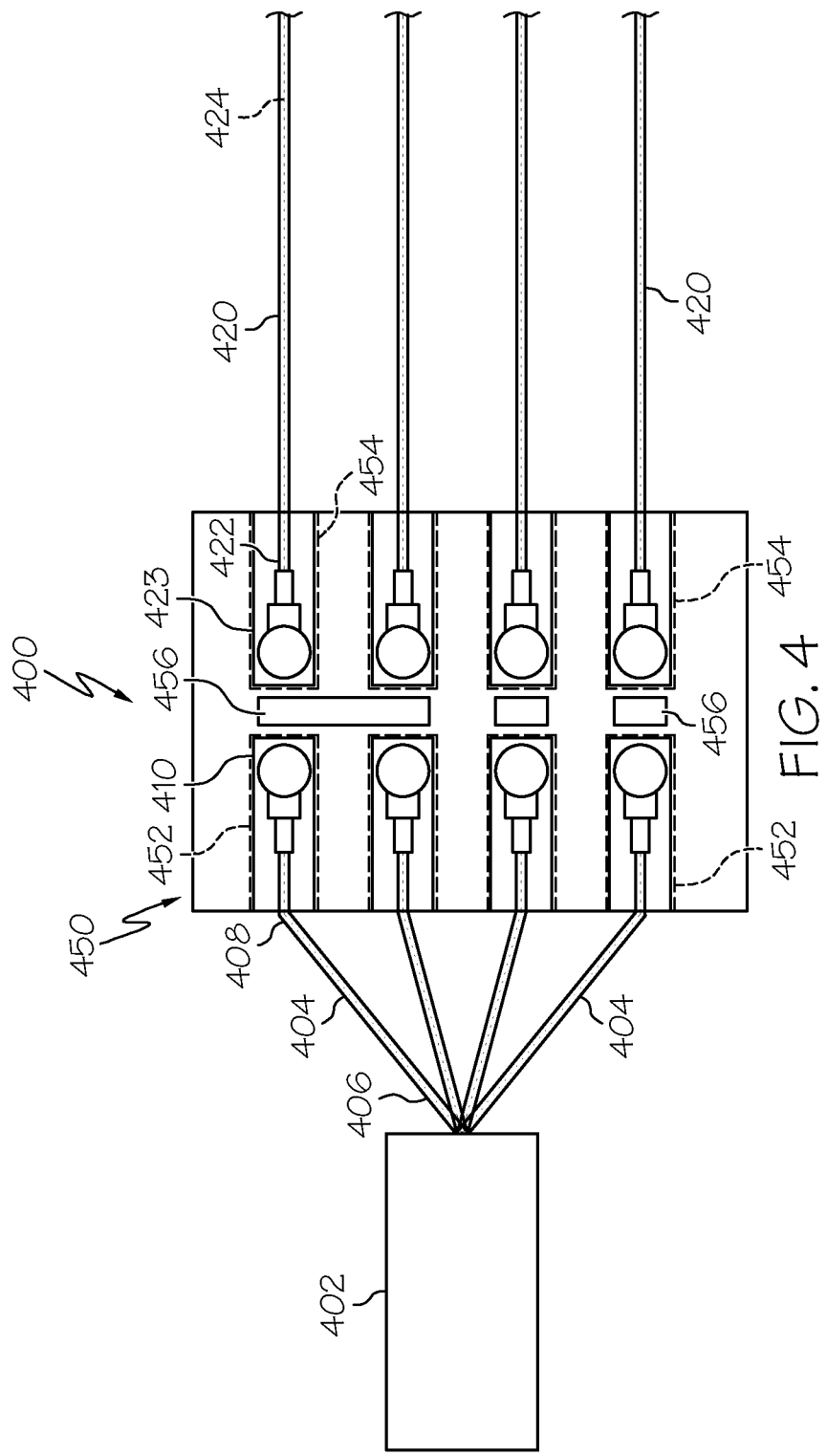

US 8,897,611 B2

OPTICAL FIBER INTERFACES COMPRISING LIGHT BLOCKING ELEMENTS AND ILLUMINATION SYSTEMS COMPRISING LIGHT BLOCKING ELEMENTS

BACKGROUND

1. Field

The present disclosure relates to optical fiber interfaces and illumination systems and, more specifically, to optical fiber interfaces comprising light blocking elements and illumination systems comprising light blocking elements.

2. Technical Background

Optical fibers may be utilized in a variety of diverse applications. In some applications, optical fibers may be coupled via an optical fiber interface that couples one or more optical input fibers to one or more optical output fibers so that light may be transmitted from the one or more optical input fibers to the one or more optical output fibers. It may be desirable for optical fiber interfaces and illumination systems to reduce the transmission of light from the optical fiber interface in some circumstances. Further, in applications in which an optical input fiber is coupled to an optical output fiber via an optical fiber interface, it may be desirable to reduce the transmission of light from the optical fiber interface when a powered optical input fiber is connected to the optical fiber interface and the optical output fiber is not connected to the optical fiber interface.

Accordingly, alternative optical fiber interfaces and illumination systems are desired.

SUMMARY

In one embodiment, an optical fiber interface includes an optical fiber connector including a receptacle and an axis of propagation along which light traverses through the optical fiber connector. The receptacle includes a first member pivotably attached to the receptacle. The first member includes a first aperture. The first member has a blocking position relative to the receptacle in which the first aperture is not aligned with the axis of propagation, such that light traversing along the axis of propagation does not pass through the first aperture. The first member has a transmitting position relative to the receptacle in which the first aperture is aligned with the axis of propagation such that light traversing along the axis of propagation passes through the first aperture.

In another embodiment, an optical fiber interface includes an interface housing including a receptacle, a light input for receiving light, an optical path between the light input and the receptacle through which the light traverses the interface housing along an axis of propagation, and a movable light blocking element. The light blocking element has a blocking position relative to the receptacle in which the light blocking element is disposed in the optical path between the light input and the receptacle. The light blocking element has a transmitting position relative to the receptacle in which the light blocking element does not interrupt the optical path between the light input and the receptacle. The light blocking element transitions from the blocking position to the transmitting position by moving in a direction substantially nonparallel to the axis of propagation.

In yet another embodiment, an illumination system includes a light source that emits light, a plurality of bus input fibers, a plurality of bus output fibers, and a bus housing. The bus housing includes a plurality of bus input fiber receptacles optically aligned with a plurality of bus output fiber receptacles and a plurality of light blocking elements disposed between the plurality of bus input fiber receptacles and the plurality of bus output fiber receptacles. Each bus input fiber has an input end, an output end, and an input fiber connector affixed to the bus input fiber. Each bus output fiber has an input end and an output fiber connector affixed to the input end. The input end of the bus input fiber is optically coupled to the light source. The input fiber connector of the bus input fiber is releasably engageable with the bus input fiber receptacle. The output fiber connector of the bus output fiber is releasably engageable with the bus output fiber receptacle. When the output fiber connector of the bus output fiber does not engage the bus output fiber receptacle, the light blocking element is in a blocking position in which the light blocking element interrupts an optical path between the bus input fiber receptacle and the bus output fiber receptacle. As the output fiber connector of the bus output fiber is inserted into the bus output fiber receptacle, the light blocking element is moved from the blocking position to a transmitting position in which the light blocking element no longer interrupts the optical path between the bus input fiber receptacle and the bus output fiber receptacle, thereby permitting the light emitted from the light source to traverse through the bus input fiber and to be coupled into the bus output fiber in the bus housing.

Additional features and advantages of the invention will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The following detailed description of specific embodiments of the present disclosure can be best understood when read in conjunction with the following drawings, where like structure is indicated with like reference numerals and in which:

FIG. 1B schematically depicts a cross sectional view of the optical fiber interface of FIG. 1A, in which the mating optical fiber connector is positioned within the receptacle of the optical fiber connector such that the light blocking element of the optical fiber connector is pivoted into a transmitting position, according to one or more embodiments shown and described herein;

FIG. 1D schematically depicts a cross sectional view of the optical fiber interface of FIG. 1C, in which the mating optical fiber connector is positioned within the receptacle of the optical fiber connector such that the light blocking element of the optical fiber connector is pivoted into a transmitting position, according to one or more embodiments shown and described herein;

FIG. 2A schematically depicts a cross sectional view of an optical fiber interface comprising an interface housing with a light blocking element and a receptacle, along with a first optical fiber connector positioned outside of the receptacle of the interface housing, such that the light blocking element of the interface housing is in a blocking position, according to one or more embodiments shown and described herein;

FIG. 2B schematically depicts a cross sectional view of the optical fiber interface of FIG. 2A, in which the first optical fiber connector is positioned within the receptacle of the interface housing such that the light blocking element of the interface housing is moved into a transmitting position, according to one or more embodiments shown and described herein;

FIG. 3A schematically depicts a cross sectional view of an optical fiber interface comprising an interface housing with a light blocking element and a receptacle, along with a first optical fiber connector positioned outside of the receptacle of the interface housing, such that the light blocking element of the interface housing is in a blocking position, according to one or more embodiments shown and described herein;

FIG. 3B schematically depicts a cross sectional view of the optical fiber interface of FIG. 3A, in which the first optical fiber connector is positioned within the receptacle of the interface housing such that the light blocking element of the interface housing is moved into a transmitting position, according to one or more embodiments shown and described herein;

FIG. 4 schematically depicts an illumination system comprising a bus housing including a plurality of light blocking elements, according to one or more embodiments shown and described herein.

DETAILED DESCRIPTION

Features and advantages of the various embodiments of the present disclosure will now be described. However, the present disclosure should not be construed as limited to the embodiments set forth herein.

Embodiments described herein generally relate to optical fiber interfaces and illumination systems comprising light blocking elements. The optical fiber interfaces and illumination systems including bus housings described herein include light blocking elements that may reduce the transmission of light from the optical fiber interface or the bus housing when the light blocking element is in a blocking position. Various optical fiber interfaces and illumination systems comprising light elements will be described in further detail herein with specific reference to the appended drawings.

Figure 1A:
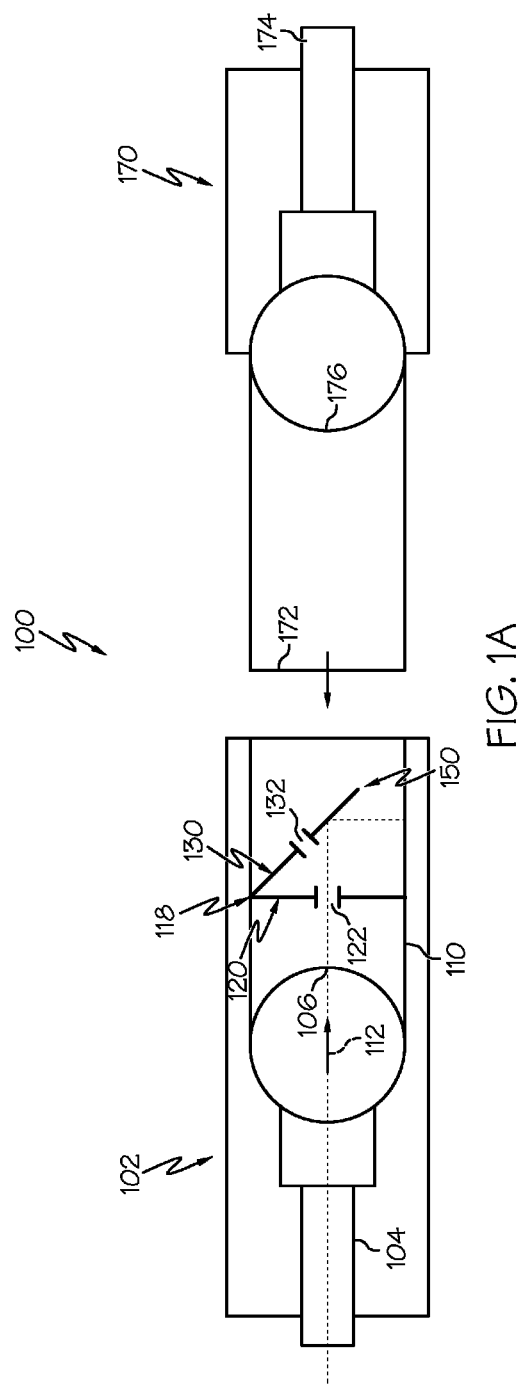
FIG. 1A schematically depicts a cross sectional view of an optical fiber interface comprising an optical fiber connector having a light blocking element and a receptacle, along with a mating optical fiber connector positioned outside of the receptacle of the optical fiber connector such that the light blocking element of the optical fiber connector is in a blocking position, according to one or more embodiments shown and described herein.

Referring now to FIG. 1A, a cross sectional view of an optical fiber interface 100 including an optical fiber connector 102 and a mating optical fiber connector 170 is schematically depicted. The optical fiber connector 102 comprises a receptacle 110 that includes a light blocking element 118. The light blocking element 118 comprises a first member 130 pivotably attached to the receptacle 110. In the embodiment depicted in FIG. 1A, the receptacle 110 further includes a second member 120 attached to the first member 130. While the embodiment depicted in FIG. 1A depicts the light blocking element 118 as including the first member 130 and the second member 120, it should be understood that in other embodiments (such as the embodiment of FIG. 1C, which will be described below), the light blocking element 118 may not include the second member 120.

In some embodiments in which the light blocking element 118 includes a first member 130 and a second member 120, the first member 130 and the second member 120 may be integrally formed such that the first member 130 and the second member 120 form a unitary component. The first member 130 and the second member 120 may be made from plastic, metal, or composite materials.

The first member 130 comprises a first aperture 132. The second member 120 includes a second aperture 122. While the second aperture 122 is positioned in the center of the second member 120 in the embodiment depicted in FIG. 1A, in other embodiments, the second aperture 122 may be offset from the center of the second member 120. Similarly, while the first aperture 132 is positioned in the center of the first member 130 in the embodiment depicted in FIG. 1A, in other embodiments, the first aperture 132 may be offset from the center of the first member 130. Further, while the second aperture 122 and the first aperture 132 are substantially the same size in the embodiment depicted in FIG. 1A, in other embodiments, the size of the second aperture 122 may be larger or smaller than the size of the first aperture 132. In some embodiments, the second aperture 122 may be larger than the first aperture 132, such that the first aperture 132 may be positioned within the second aperture 122 when the first member 130 is pivoted towards the second member 120.

The first member 130 of the light blocking element 118 has a blocking position 150 relative to the receptacle 110, as depicted in FIG. 1A. In some embodiments, the first member 130 may be biased into the blocking position by a biasing member such as, for example, a spring. In some embodiments, such as embodiments in which the first member 130 and the second member 120 are integrally formed, a biasing member may not be required in order for the first member 130 to be positioned in the blocking position 150 when the mating optical fiber connector 170 is absent from the receptacle 110. In some embodiments, the first member 130 and the second member 120 may be connected by a living hinge.

In the embodiment of FIG. 1A, the optical fiber connector 102 is affixed to an output end 106 of a first optical fiber 104. In embodiments in which the optical fiber connector 102 is affixed to an optical fiber, the optical fiber may include a lens element (e.g., a ball lens, a GRIN lens, or any other type of lens scheme), affixed to an end of the fiber. In other embodiments in which the optical fiber connector 102 is affixed to an optical fiber, the optical fiber may not include a lens element. While the optical fiber connector 102 is affixed to an output end 106 of a first optical fiber 104 in FIG. 1A, it should be understood that in other embodiments, the optical fiber connector 102 may exist separate from an optical fiber, such as when the optical fiber connector 102 is a separate component that is not affixed to an end of an optical fiber.

In the embodiment of FIG. 1A, the mating optical fiber connector 170 is affixed to an input end 176 of a second optical fiber 174. In embodiments in which the mating optical fiber connector 170 is affixed to an optical fiber, the optical fiber may include a lens element (e.g., a ball lens, a GRIN lens, or any other type of lens scheme), affixed to an interfacing end of the fiber that receives light from an adjacent optical fiber. In other embodiments in which the mating optical fiber connector 170 is affixed to an optical fiber, the optical fiber may not include a lens element. While the mating optical fiber connector 170 is affixed to the input end 176 of the second optical fiber 174 in FIG. 1A, it should be understood that in other embodiments, the mating optical fiber connector 170 may exist separate from an optical fiber, such as when the mating optical fiber connector 170 is a separate component that is not affixed to an end of an optical fiber.

The mating optical fiber connector 170 includes an engagement face 172. The receptacle 110 of the optical fiber connector 102 is adapted to receive at least a portion of the mating optical fiber connector 170 such that the mating optical fiber connector 170 may be inserted into the receptacle 110 as to couple the optical fiber connector 102 and the mating optical fiber connector 170.

In one embodiment in which the optical fiber interface 100 includes the first optical fiber 104 and the second optical fiber 174, the first optical fiber 104 is an ultraviolet transmitting fiber and the second optical fiber 174 is a light diffusing optical fiber. In embodiments in which the second optical fiber 174 is a light diffusing optical fiber, the second optical fiber 174 may be a light diffusing optical fiber as described in U.S. patent application Ser. No. 13/213,363, entitled "OPTICAL FIBER ILLUMINATION SYSTEMS AND METHODS," the entirety of which is incorporated by reference herein. However, it should be understood that in other embodiments the first optical fiber 104 may be an optical fiber other than an ultraviolet transmitting fiber (e.g., an optical fiber adapted to transmit visible light or infrared light) and/or the second optical fiber 174 may be an optical fiber other than light diffusing optical fiber.

In general, light traverses through the optical fiber connector 102 along an axis of propagation 112. The second aperture 122 of the second member 120 is aligned with the axis of propagation 112 such that light traversing the optical fiber connector 102 may pass through the second aperture 122. In embodiments in which the optical fiber connector 102 is affixed to an output end 106 of a first optical fiber 104, the light may traverse through the first optical fiber 104 along the axis of propagation 112 within the optical fiber connector 102.

Still referring to FIG. 1A, as discussed hereinabove, the first member 130 of the light blocking element 118 has a blocking position 150 relative to the receptacle 110 before the mating optical fiber connector 170 is inserted into the receptacle 110. When the first member 130 is oriented in the blocking position 150, the first aperture 132 is not aligned with the axis of propagation 112, such that light traversing along the axis of propagation 112 passes through the second aperture 122, but not the first aperture 132. Instead, light traversing along the axis of propagation 112 is interrupted and prevented from traversing beyond the first member 130.

Referring now to FIG. 1B, a cross sectional view of the optical fiber interface of FIG. 1A is schematically depicted when the mating optical fiber connector 170 is positioned within the receptacle 110 of the optical fiber connector 102. As the mating optical fiber connector 170 is inserted into the receptacle 110 of the optical fiber connector 102, the engagement face 172 of the mating optical fiber connector 170 engages the first member 130, thereby pivoting the first member 130 into the transmitting position 160. When the first member 130 is positioned in the transmitting position 160 relative to the receptacle 110, the first aperture 132 is aligned with the axis of propagation 112 such that light traversing along the axis of propagation 112 passes through both the first aperture 132 of the first member 130 and through the second aperture 122 of the second member 120. As such, optical fiber interfaces 100 according to the present disclosure block light from passing from the optical fiber connector 102 when the mating optical fiber connector 170 is removed from the receptacle 110, and allows light to pass from the first optical fiber 104 to the second optical fiber 174 when the mating optical fiber connector 170 is positioned within the receptacle 110.

Figure 1C:
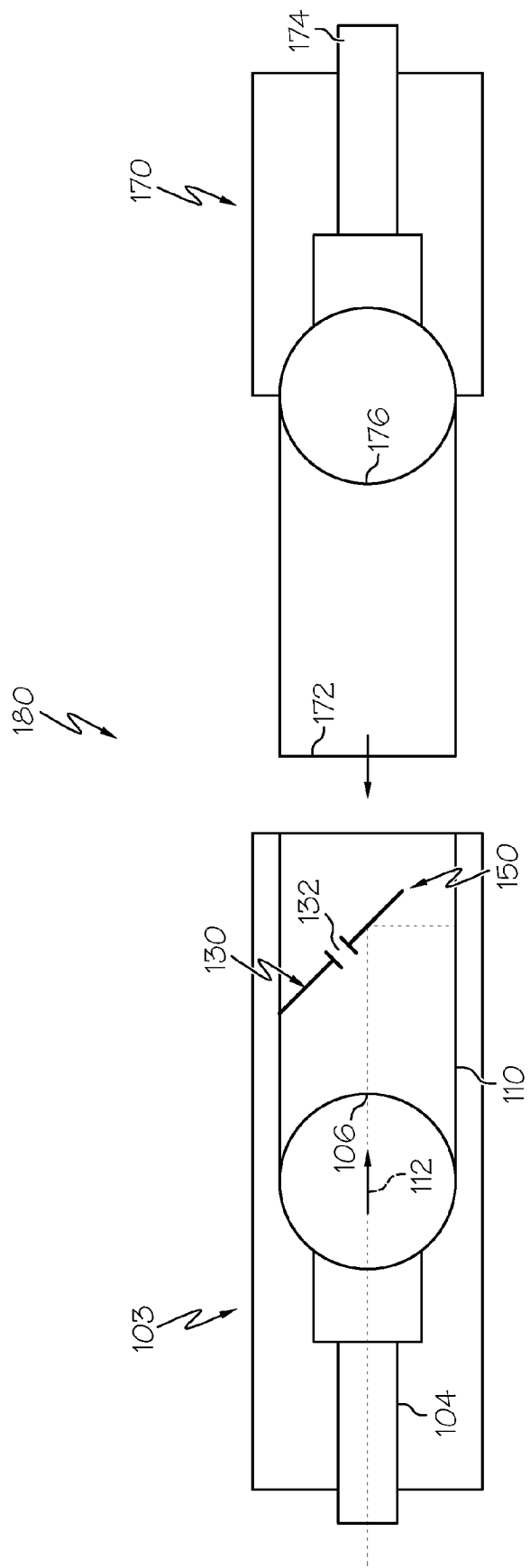
FIG. 1C schematically depicts a cross sectional view of an optical fiber interface comprising an optical fiber connector having a light blocking element and a receptacle, along with a mating optical fiber connector positioned outside of the receptacle of the optical fiber connector such that the light blocking element of the optical fiber connector is in a blocking position, according to one or more embodiments shown and described herein.

Referring now to FIG. 1C, a cross sectional view of an optical fiber interface 180 including an optical fiber connector 103 and a mating optical fiber connector 170 is schematically depicted. The optical fiber connector 103 is similar to the optical fiber connector 102 described above in reference to FIG. 1A, except that the optical fiber connector 103 does not include a second member 120 attached to the first member 130. Other than this difference, the optical fiber connector 103 of FIG. 1C is structured the same as the optical fiber connector of FIG. 1A.

Referring now to FIG. 1D, a cross sectional view of the optical fiber interface 180 of FIG. 1C is schematically depicted when the mating optical fiber connector 170 is positioned within the receptacle 110 of the optical fiber connector 103. As the mating optical fiber connector 170 is inserted into the receptacle 110 of the optical fiber connector 103, the engagement face 172 of the mating optical fiber connector 170 engages the first member 130, thereby pivoting the first member 130 into the transmitting position 160. When the first member 130 is positioned in the transmitting position 160 relative to the receptacle 110, the first aperture 132 is aligned with the axis of propagation 112 such that light traversing along the axis of propagation 112 passes through the first aperture 132. As such, optical fiber interfaces 180 according to the present disclosure block light from passing from the optical fiber connector 103 when the mating optical fiber connector 170 is removed from the receptacle 110, and allows light to pass from the first optical fiber 104 to the second optical fiber 174 when the mating optical fiber connector 170 is positioned within the receptacle 110.

Referring now to FIG. 2A, a cross sectional view of an optical fiber interface 200 comprising an interface housing 202 and a first optical fiber connector 250 is schematically depicted. While the optical fiber interface 200 depicted in FIG. 2A includes the first optical fiber connector 250, it should be understood that in other embodiments, the optical fiber interface 200 may not include the first optical fiber connector 250.

The first optical fiber connector 250 includes a first mirror 252 and a first optical fiber 254. In some embodiments, the first optical fiber 254 is a light diffusing optical fiber. In embodiments in which the first optical fiber 254 is a light diffusing optical fiber, the first optical fiber 254 may be a light diffusing optical fiber as described in U.S. patent application Ser. No. 13/213,363, entitled "OPTICAL FIBER ILLUMINATION SYSTEMS AND METHODS," the entirety of which is incorporated by reference herein. In embodiments in which the first optical fiber connector 250 includes the first optical fiber 254, the first optical fiber 254 may include a lens element 256 (e.g., a ball lens, a GRIN lens, or any other type of lens scheme), affixed to an end of the first optical fiber 254. In other embodiments in which the first optical fiber connector 250 includes the first optical fiber 254, the optical fiber may not include a lens element.

The interface housing 202 includes a receptacle 204, a light input 206 for receiving light, an optical path 208 between the light input 206 and the receptacle 204, and a movable light blocking element 210. The receptacle 204 of the interface housing 202 is adapted to receive the first optical fiber connector 250 so that the first optical fiber connector 250 may be inserted into the receptacle 204 in order to couple the interface housing 202 and the first optical fiber connector 250.

The light blocking element 210 has a blocking position 220 relative to the receptacle 204, as depicted in FIG. 2A. In some embodiments, the light blocking element 210 may be biased into the blocking position 220 by a biasing member, for example a spring. However, it should be understood that other embodiments of the interface housing 202 may not include a biasing member. In some embodiments, the light blocking element 210 is a light dump or a beam dump, which absorbs light traversing along the optical path 208. In embodiments in which the light blocking element 210 is a light dump, the light blocking element 210 may be formed from a metal material, such as anodized aluminum. In some embodiments in which the light blocking element 210 is a light dump formed from anodized aluminum, the anodized aluminum may be black. However, it should be understood that in other embodiments the light dump may be formed from a material other than anodized aluminum.

In the embodiment of FIG. 2A, the interface housing 202 includes a second receptacle 215, which serves as the light input 206 through which light is received. In some embodiments, the second receptacle 215 is adapted to receive an optical input fiber connector 222 affixed to an input optical fiber, such that light input from the input optical fiber may be introduced into the interface housing 202 when the optical input fiber connector 222 is inserted into the second receptacle 215. While the embodiment depicted in FIG. 2A includes a second receptacle 215 for receiving the optical input fiber connector 222 that introduces light into the interface housing 202 from the optical input fiber, it should be understood that in other embodiments the interface housing 202 may not include a second receptacle, such as in embodiments in which the interface housing 202 is directly affixed to an end of an optical fiber that introduces light into the interface housing 202 at the light input 206.

In general, light traverses along the optical path 208 of the interface housing 202 along an axis of propagation 209. As discussed hereinabove, the light blocking element 210 has a blocking position 220 relative to the receptacle 204 before the first optical fiber connector 250 is inserted into the receptacle 204, as depicted in FIG. 2A. When the light blocking element 210 is positioned in the blocking position 220, the light blocking element 210 is disposed in the optical path 208 between the light input 206 and the receptacle 204, thereby blocking light that enters the interface housing 202 from leaving the receptacle 204 of the interface housing 202.

Referring now to FIG. 2B, a cross sectional view of the optical fiber interface 200 of FIG. 2A in which the first optical fiber connector 250 is positioned within the receptacle 204 of the interface housing 202 is schematically depicted. As the first optical fiber connector 250 is inserted into the receptacle 204 of the interface housing 202, the first optical fiber connector 250 engages the light blocking element 210, thereby moving the light blocking element 210 of the interface housing 202 from the blocking position 220 into a transmitting position 230. As depicted by the transition from FIG. 2A to FIG. 2B, the light blocking element 210 transitions from the blocking position 220 to the transmitting position 230 by moving in a direction substantially nonparallel to the axis of propagation 209. While the light blocking element 210 transitions from the blocking position 220 into the transmitting position 230 by moving (e.g., by translating) in a direction substantially perpendicular to the axis of propagation 209 (as depicted by the transition from FIG. 2A to FIG. 2B), in other embodiments the light blocking element 210 transitions from the blocking position 220 into the transmitting position 230 by moving in a direction nonparallel to the axis of propagation 209, but not substantially perpendicular to the axis of propagation 209. The blocking element 210 may move from the blocking position 220 into the transmitting position 230 by sliding, pivoting, turning, and the like.

As depicted in FIG. 2B, when the light blocking element 210 is in the transmitting position 230 relative to the receptacle 204, the light blocking element 210 is moved from the optical path 208 such that the light blocking element 210 no longer interrupts the optical path 208 between the light input 206 and the receptacle 204. When the light blocking element 210 is positioned in the transmitting position 230, light received from the light input 206 is incident upon the first mirror 252, which reflects the light through the first optical fiber connector 250. As such, optical fiber interfaces 200 according to the present disclosure block light from passing from the light input 206 to the receptacle 204 when the first optical fiber connector 250 is removed from the receptacle 204, and allows light to pass from the light input 206 to the first optical fiber 254 when first optical fiber connector 250 is positioned within the receptacle 204.

While FIG. 2B depicts the light as reflecting off of the first mirror 252 through the first optical fiber connector 250 in a direction substantially perpendicular to the axis of propagation 209, in other embodiments the light may reflect off of the first mirror 252 in a direction not perpendicular to the axis of propagation 209.

Referring now to FIG. 3A, a cross sectional view of an optical fiber interface 300 comprising an interface housing 302 and a first optical fiber connector 350 is schematically depicted. While the optical fiber interface 300 depicted in FIG. 3A includes the first optical fiber connector 350, it should be understood that in other embodiments, the optical fiber interface 300 may not include the first optical fiber connector 350.

The first optical fiber connector 350 includes a first mirror 352 and a first optical fiber 354. In some embodiments, the first optical fiber 354 is a light diffusing optical fiber. In embodiments in which the first optical fiber 354 is a light diffusing optical fiber, the first optical fiber 354 may be a light diffusing optical fiber as described in U.S. patent application Ser. No. 13/213,363, entitled "OPTICAL FIBER ILLUMINATION SYSTEMS AND METHODS," the entirety of which is incorporated by reference herein. In embodiments in which the first optical fiber connector 350 includes the first optical fiber 354, the first optical fiber 354 may include a lens element 356 (e.g., a ball lens, a GRIN lens, or any other type of lens scheme), affixed to an end of the first optical fiber 354. In other embodiments in which the first optical fiber connector 350 includes the first optical fiber 354, the optical fiber may not include a lens element.

The interface housing 302 includes a receptacle 304, a light input 306 for receiving light, a housing mirror 340, an optical path 308 between the housing mirror 340 and the receptacle 304, and a movable light blocking element 310. The receptacle 304 of the interface housing 302 is adapted to receive the first optical fiber connector 350 such that the first optical fiber connector 350 may be inserted into the receptacle 304. When the first optical fiber connector 350 is positioned within the receptacle 304, the interface housing 302 is coupled to the first optical fiber connector 350.

The light blocking element 310 has a blocking position 320 relative to the receptacle 304, as depicted in FIG. 3A. In some embodiments, the light blocking element 310 may be biased into the blocking position 320 by a biasing member, such as a spring. However, it should be understood that other embodiments may not include a biasing member. In some embodiments, the light blocking element 310 is a light dump or a beam dump, which absorbs light traversing along the optical path 308. In embodiments in which the light blocking element 310 is a light dump, the light blocking element 310 may be formed from a metal material, such as anodized aluminum. In some embodiments in which the light blocking element 310 is a light dump formed from anodized aluminum, the anodized aluminum may be black. However, it should be understood that in other embodiments the light dump may be formed from a material other than anodized aluminum.

In the embodiment of FIG. 3A, the interface housing 302 includes a second receptacle 315, which serves as the light input 306 through which light is received. In some embodiments, the second receptacle 315 is adapted to receive an optical input fiber connector 322 affixed to an input optical fiber, such that light input from the input optical fiber may be introduced into the interface housing 302 when the optical input fiber connector 322 is positioned within the second receptacle 315. While the embodiment depicted in FIG. 3A includes a second receptacle 315 for receiving the optical input fiber connector 322 that introduces light into the interface housing 302 from the optical input fiber, it should be understood that in other embodiments the interface housing 302 may not include a second receptacle, for example in embodiments in which the interface housing 302 is directly affixed to an end of an optical fiber that introduces light into the interface housing 302 at the light input 306.

In general, light enters the interface housing 302 from the light input 306, reflects off of the housing mirror 340, and follows the optical path 308 to the receptacle 304 along an axis of propagation 309. As discussed hereinabove, the light blocking element 310 has a blocking position 320 relative to the receptacle 304 when the first optical fiber connector 350 is separated from the receptacle 304, as depicted in FIG. 3A. When the light blocking element 310 is positioned in the blocking position 320, the light blocking element 310 is disposed in the optical path 308 between the housing mirror 340 and the receptacle 304, thereby blocking light that enters the interface housing 302 from leaving the receptacle 304 of the interface housing 302.

Referring now to FIG. 3B, a cross sectional view of the optical fiber interface 300 of FIG. 3A in which the first optical fiber connector 350 is positioned within the receptacle 304 of the interface housing 302 is schematically depicted. As the first optical fiber connector 350 is inserted into the receptacle 304 of the interface housing 302, the first optical fiber connector 350 engages the light blocking element 310, thereby moving the light blocking element 310 of the interface housing 302 from the blocking position 320 into a transmitting position 330. As depicted by the transition from FIG. 3A to FIG. 3B, the light blocking element 310 transitions from the blocking position 320 to the transmitting position 330 by moving in a direction substantially nonparallel to the axis of propagation 309. While the light blocking element 310 transitions from the blocking position 320 into the transmitting position 330 by moving (e.g., by translating) in a direction substantially perpendicular to the axis of propagation 309 (as depicted by the transition from FIG. 3A to FIG. 3B), in other embodiments the light blocking element 310 transitions from the blocking position 320 into the transmitting position 330 by moving in a direction nonparallel to the axis of propagation 309, but not substantially perpendicular to the axis of propagation 309. The blocking element 310 may move from the blocking position 320 into the transmitting position 330 by sliding, pivoting, turning, and the like.

As depicted in FIG. 3B, when the light blocking element 310 is in the transmitting position 330 relative to the receptacle 304, the light blocking element 310 is moved from the optical path 308, such that the light blocking element 310 no longer interrupts the optical path 308 between the housing mirror 340 and the receptacle 304. When the light blocking element 310 is positioned in the transmitting position 330, the light received from the light input 306 is incident upon the housing mirror 340, which reflects the light into the first mirror 352, which reflects the light through the first optical fiber connector 350. As such, optical fiber interfaces 300 according to the present disclosure block light from passing from the light input 306 to the receptacle 304 when the first optical fiber connector 350 is removed from the receptacle 304, and allows light to pass from the light input 306 to the first optical fiber 354 when first optical fiber connector 350 is positioned within the receptacle 304.

While FIG. 3B depicts the light as reflecting off of the first mirror 352 through the first optical fiber connector 350 in a direction substantially perpendicular to the axis of propagation 309, in other embodiments the light may reflect off of the first mirror 352 in a direction not perpendicular to the axis of propagation 309.

While the interface housing 302 depicted in FIGS. 3A and 3B includes one housing mirror 340 upon which light is reflected from the light input 306, in other embodiments, the interface housing 302 may include a plurality of housing mirrors, which reflect the light received from the light input 306 into the receptacle 304.

Referring now to FIG. 4, an illumination system 400 comprising a bus housing 450 that includes a plurality of light blocking elements 456 is schematically depicted. The illumination system 400 includes a light source 402 that emits light, a plurality of bus input fibers 404, a plurality of bus output fibers 420, and a bus housing 450. The light source 402 may emit light having any wavelength. In some embodiments, the light source 402 may emit light in the ultraviolet spectrum. In other embodiments, the light source may emit light in the visible spectrum or in the infrared spectrum.

The bus housing 450 has a plurality of bus input fiber receptacles 452 optically aligned with a plurality of bus output fiber receptacles 454 and a plurality of light blocking elements 456 disposed between the plurality of bus input fiber receptacles 452 and the plurality of bus output fiber receptacles 454. In some embodiments, a single light blocking element 456 may be disposed between a single bus input fiber receptacle 452 and a single bus output fiber receptacle 454. In other embodiments, a single light blocking element 456 may be disposed between multiple bus input fiber receptacles 452 and multiple bus output fiber receptacles 454.

In some embodiments, one or more of the plurality of light blocking elements 456 may be substantially similar to the light blocking element 118 depicted in FIGS. 1A-1B and described hereinabove. In other embodiments, one or more of the plurality of light blocking elements 456 may be substantially similar to the first member 130 depicted in FIGS. 1C-1D and described hereinabove. In still other embodiments, one or more of the plurality of light blocking elements 456 may be substantially similar to the light blocking element 210 depicted in FIGS. 2A-2B and described hereinabove. In some embodiments, the light blocking element may be biased into the blocking position by a biasing member. In some embodiments, the light blocking element may be a light dump or a beam dump. In embodiments in which the light blocking element is a light dump, the light blocking element may be formed from a metal material, such as anodized aluminum. In some embodiments in which the light blocking element is a light dump formed from anodized aluminum, the anodized aluminum may be black. However, it should be understood that in other embodiments the light dump may be formed from a material other than anodized aluminum.

Each of the plurality of bus input fibers 404 has an input end 406, an output end 408, and an input fiber connector 410 affixed to the bus input fiber 404. The input end 406 of the bus input fiber 404 is optically coupled to the light source 402, such that light may traverse along the bus input fiber 404. In some embodiments, each bus input fiber has a lens element affixed to the output end 408 of the bus input fiber 404. In some embodiments, the plurality of bus input fibers may be ultraviolet transmitting fibers. In other embodiments, the plurality of bus input fibers may be optical fibers adapted to transmit light of a wavelength other than ultraviolet light. The input fiber connector 410 of the bus input fiber 404 is releasably engageable with the bus input fiber receptacle 452, which is adapted for receiving the input fiber connector 410.

Each of the plurality of bus output fibers 420 has an input end 422 and an output fiber connector 423 affixed to the input end 422. The output fiber connector 423 of the bus output fiber 420 is releasably engageable with the bus output fiber receptacle 454, which is adapted for receiving the output fiber connector 423.

When the output fiber connector 423 of the bus output fiber 420 does not engage the bus output fiber receptacle 454, the light blocking element 456 is positioned in a blocking position in which the light blocking element 456 interrupts an optical path between the bus input fiber receptacle 452 and the bus output fiber receptacle 454. As the output fiber connector 423 of the bus output fiber 420 is inserted into the bus output fiber receptacle 454, the light blocking element 456 is moved from the blocking position to a transmitting position in which the light blocking element 456 does not interrupt the optical path between the bus input fiber receptacle 452 and the bus output fiber receptacle 454, thereby permitting the light emitted from the light source 402 to traverse through the bus input fiber 404 and to be directed into the bus output fiber 420 in the bus housing 450.

In some embodiments, when the input fiber connector 410 engages the bus input fiber receptacle 452 and the output fiber connector 423 engages the bus output fiber receptacle 454, the input fiber connector 410 and the output fiber connector 423 may be spaced apart such that light may traverse from the output end 408 of the bus input fiber 404, through free space, to the input end 422 of the bus output fiber 420.

While the embodiment depicted in FIG. 4 shows the plurality of bus input fibers 404 optically coupled to the plurality of bus output fibers 420 via an in-line connection configuration (such as that employed by the optical fiber interface 100 of FIGS. 1A-1B or the optical fiber interface 180 of FIGS. 1C-1D), it should be understood that in other embodiments, at least one of the plurality of bus input fibers 404 may be optically coupled to at least one of the plurality of bus output fibers 420 through another alignment configuration (for example, an alignment employing the optical fiber interface 200 of FIGS. 2A-2B and/or the optical fiber interface 300 of FIGS. 3A-3B, as discussed hereinabove).

Still referring to FIG. 4, in some embodiments (not shown), the plurality of bus input fibers 404 may be affixed to a single connector (e.g., a ribbon connector), which may be inserted into a corresponding receptacle in the bus housing 450, such that the plurality of bus input fibers 404 are aligned with the plurality of light blocking elements 456. Similarly, in some embodiments (not shown), the plurality of bus output fibers 420 may be affixed to a single connector (e.g., a ribbon connector), which may be inserted into a corresponding receptacle in the bus housing 450, such that the plurality of bus output fibers 420 are aligned with the plurality of light blocking elements 456.

Figure 5:
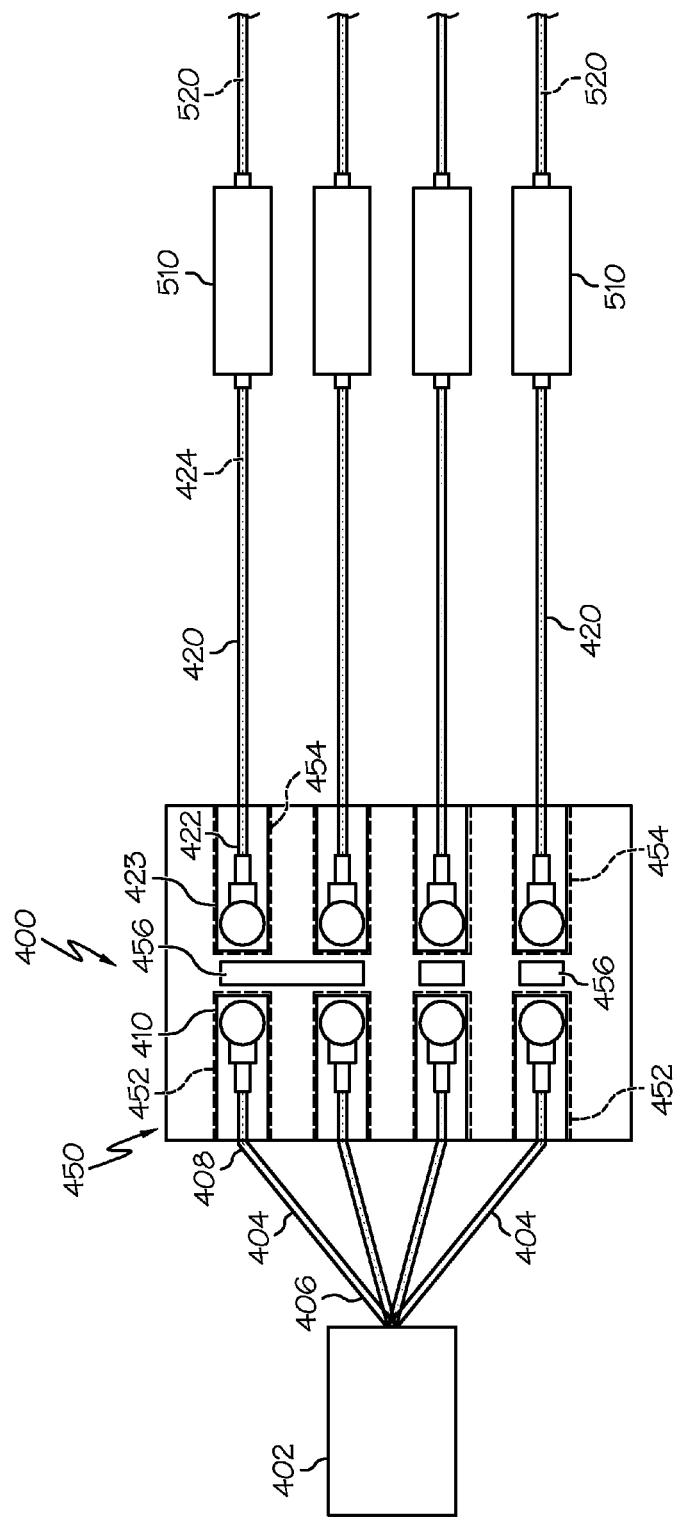
FIG. 5 schematically depicts the illumination system of FIG. 4 along with a plurality of optical fiber interfaces that optically couple the plurality of output fibers with a plurality of secondary fibers, according to one or more embodiments shown and described herein.

Referring now to FIG. 5, the illumination system 400 of FIG. 4 is schematically depicted. The illumination system 400 further includes a plurality of optical fiber interfaces 510 that interface the plurality of bus output fibers 420 with a plurality of secondary fibers 520, such that light traversing through the plurality of bus output fibers 420 may be optically transmitted to the plurality of secondary fibers 520. In some embodiments, at least one of the plurality of optical fiber interfaces 510 may be the optical fiber interface 100 depicted in FIGS. 1A-1B and discussed hereinabove. In other embodiments, at least one of the plurality of optical fiber interfaces 510 may be the optical fiber interface 180 depicted in FIGS. 1C-1D and discussed hereinabove. In some embodiments, at least one of the plurality of optical fiber interfaces 510 may be the optical fiber interface 200 depicted in FIGS. 2A-2B and discussed hereinabove. In some embodiments, at least one of the plurality of optical fiber interfaces 510 may be the optical fiber interface 300 depicted in FIGS. 3A-3B and discussed hereinabove. While the embodiment depicted in FIG. 5 shows the plurality of bus output fibers 420 optically coupled to the plurality of secondary fibers 520 via an in-line connection configuration (such as that employed by the optical fiber interface 100 depicted in FIGS. 1A-1B of the optical fiber interface 180 depicted in FIGS. 1C-1D), it should be understood that in other embodiments, at least one of the plurality of bus output fibers 420 may be optically coupled to at least one of the plurality of secondary fibers 520 via another alignment configuration (for example, an alignment that employs the optical fiber interface 200 depicted in FIGS. 2A-2B and/or the optical fiber interface 300 depicted in FIGS. 3A-3B).

It should now be understood that the optical fiber interfaces and illumination systems including bus housings described herein may include light blocking elements that may reduce the transmission of light from the optical fiber interface or the bus housing when the light blocking element is in a blocking position. Further, in applications in which an optical input fiber may be coupled to an optical output fiber via an optical fiber interface including a light blocking element as described herein, the light blocking element may reduce the transmission of light from the optical fiber interface when a powered optical input fiber is connected to the optical fiber interface and the optical output fiber is not connected to the optical fiber interface. In such applications, when the optical output fiber is connected to the optical fiber interface, the light blocking element is positioned such that interruption of the transmission of light from the optical input fiber to the optical output fiber is minimized. In some embodiments in which an ultraviolet transmitting fiber is coupled to a light diffusing fiber via an optical fiber interface including a light blocking element as described herein, the light blocking element may reduce the transmission of ultraviolet light from the optical fiber interface when a powered ultraviolet transmitting fiber is connected to the optical fiber interface and the light diffusing optical fiber is not connected to the optical fiber interface.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An optical fiber interface comprising:
an optical fiber connector comprising a receptacle and an axis of propagation along which light traverses through the optical fiber connector, wherein:
the receptacle comprises a first member pivotably attached to the receptacle and the first member includes a first aperture;
the first member has a blocking position relative to the receptacle in which the first aperture is not aligned with the axis of propagation, such that light traversing along the axis of propagation does not pass through the first aperture; and
the first member has a transmitting position relative to the receptacle in which the first aperture is aligned with the axis of propagation such that light traversing along the axis of propagation passes through the first aperture.

2. The optical fiber interface of claim 1 further comprising a mating optical fiber connector comprising an engagement face, wherein:
the receptacle of the optical fiber connector is adapted to receive the mating optical fiber connector;
the first member is in the blocking position before the mating optical fiber connector is inserted into the receptacle; and
the engagement face of the mating optical fiber connector engages the first member as the mating optical fiber connector is inserted into the receptacle, thereby pivoting the first member into the transmitting position.

3. The optical fiber interface of claim 2 further comprising a first optical fiber having an output end and a second optical fiber having an input end, wherein:
the optical fiber connector is affixed to the output end of the first optical fiber; and
the mating optical fiber connector is affixed to the input end of the second optical fiber.

4. The optical fiber interface of claim 1, the receptacle further comprising a second member attached to the first member, wherein the second member comprises a second aperture aligned with the axis of propagation.

5. The optical fiber interface of claim 4, wherein the first member and the second member are integrally formed.

6. The optical fiber interface of claim 1, wherein the first member is biased into the blocking position by a biasing member.

7. An optical fiber interface comprising:
(a) an interface housing comprising a receptacle, a light input for receiving light, an optical path between the light input and the receptacle through which the light traverses the interface housing along an axis of propagation, and a movable light blocking element, wherein:
the light blocking element has a blocking position relative to the receptacle in which the light blocking element is disposed in the optical path between the light input and the receptacle;
the light blocking element has a transmitting position relative to the receptacle in which the light blocking element does not interrupt the optical path between the light input and the receptacle; and
the light blocking element transitions from the blocking position to the transmitting position by moving in a direction substantially nonparallel to the axis of propagation
(b) a first optical fiber connector comprising a first mirror, wherein the light blocking element is in the blocking position when the first optical fiber connector is not inserted in the receptacle; and
the first optical fiber connector engages the light blocking element as the first optical fiber connector is inserted into the receptacle, thereby moving the light blocking element from the blocking position to the transmitting position; and
when the light blocking element is in the transmitting position, the light input is incident upon the first mirror, which reflects the light through the first optical fiber connector.

8. The optical fiber interface of claim 7, wherein the first optical fiber connector comprises a first optical fiber.

9. The optical fiber interface of claim 8, wherein the first optical fiber is a light diffusing optical fiber.

10. The optical fiber interface of claim 8, wherein the first optical fiber further comprises a lens element affixed to an end of the first optical fiber.

11. The optical fiber interface of claim 7, wherein the light blocking element is a light dump.

12. The optical fiber interface of claim 7, wherein the interface housing further comprises a housing mirror and the light received from the light input is incident upon the housing mirror, which reflects the light into the light blocking element when the light blocking element is in the blocking position and which reflects the light into the receptacle when the light blocking element is in the transmitting position.

13. The optical fiber interface of claim 7, wherein the interface housing further comprises a second receptacle and the light input is received through the second receptacle.

14. The optical fiber interface of claim 7, wherein the light blocking element is biased into the blocking position by a biasing member.

15. An illumination system comprising:
a light source that emits light;
a plurality of bus input fibers, each input fiber having an input end, an output end, and an input fiber connector affixed to the bus input fiber;
a plurality of bus output fibers, each bus output fiber having an input end and an output fiber connector affixed to the input end; and
a bus housing having a plurality of bus input fiber receptacles optically aligned with a plurality of bus output fiber receptacles and a plurality of light blocking elements disposed between the plurality of bus input fiber receptacles and the plurality of bus output fiber receptacles, wherein for at least one input fiber and at least one output fiber:
the input end of the bus input fiber is optically coupled to the light source;
the input fiber connector of the bus input fiber is releasably engageable with the bus input fiber receptacle; and
the output fiber connector of the bus output fiber is releasably engageable with the bus output fiber receptacle;
when the output fiber connector of the bus output fiber does not engage the bus output fiber receptacle, the light blocking element is in a blocking position in which the light blocking element interrupts an optical path between the bus input fiber receptacle and the bus output fiber receptacle; and as the output fiber connector of the bus output fiber is inserted into the bus output fiber receptacle, the light blocking element is moved from the blocking position to a transmitting position in which the light blocking element no longer interrupts the optical path between the bus input fiber receptacle and the bus output fiber receptacle, thereby permitting the light emitted from the light source to traverse through the bus input fiber and to be coupled into the bus output fiber in the bus housing.

16. The illumination system of claim 15, wherein the light blocking element is biased into the blocking position by a biasing member.

17. The illumination system of claim 15, wherein the light blocking element is a light dump.

18. The illumination system of claim 15, wherein each bus input fiber has a lens element affixed to the output end of the bus input fiber and the bus output fiber is a light diffusing optical fiber.

19. The illumination system of claim 15, wherein at least one input fiber connector and at least one output fiber connector are spaced apart such that light propagates from at least one bus input fiber, through free space, before entering at least one bus output fiber.

* * * * *